United States Patent [19]
Kershaw et al.

[11] Patent Number: 5,818,133
[45] Date of Patent: Oct. 6, 1998

[54] BRUSHLESS MOTOR WITH TUBULAR BEARING SUPPORT

[75] Inventors: Peter A. Kershaw; Marek Horski, both of London, Canada

[73] Assignee: Siemens Canada Ltd., Mississagua, Canada

[21] Appl. No.: 632,545

[22] Filed: Apr. 19, 1996

[51] Int. Cl.⁶ .................................................. H02K 7/00
[52] U.S. Cl. .............................. 310/67 R; 310/64; 310/90
[58] Field of Search ................................ 310/67 R, 64, 310/90, 68 R, 45, 261

[56] References Cited

U.S. PATENT DOCUMENTS

| | | | |
|---|---|---|---|
| Re. 33,813 | 2/1992 | von de Heide et al. | 310/51 |
| 3,559,937 | 2/1971 | Paine et al. | 248/183 |
| 3,891,878 | 6/1975 | Dochterman | 310/90 |
| 3,911,659 | 10/1975 | Mandl | 57/58.89 |
| 3,932,930 | 1/1976 | Dochterman | 29/596 |
| 4,007,390 | 2/1977 | Muller et al. | 310/90 |
| 4,194,743 | 3/1980 | Ohsawa et al. | 274/1 E |
| 4,365,444 | 12/1982 | Chwae | 51/94 |
| 4,425,520 | 1/1984 | Hiraga | 310/92 |
| 4,487,514 | 12/1984 | Mori | 384/113 |
| 4,513,566 | 4/1985 | Rajsigi et al. | 57/406 |
| 4,529,900 | 7/1985 | Uzuka | 310/43 |
| 4,556,829 | 12/1985 | von der Heide | 318/254 |
| 4,606,934 | 8/1986 | Lee et al. | 427/76 |
| 4,630,149 | 12/1986 | Ida | 360/96.4 |
| 4,647,803 | 3/1987 | von de Heide et al. | 310/51 |
| 4,693,580 | 9/1987 | Hanamori et al. | 354/271.1 |
| 4,737,673 | 4/1988 | Wrobel | 310/90 |
| 4,761,876 | 8/1988 | Kosmowski | 29/568 |
| 4,823,032 | 4/1989 | Ward et al. | 310/43 |
| 4,839,551 | 6/1989 | Tomisawa | 310/90 |
| 4,869,626 | 9/1989 | Kosmowski | 408/129 |
| 4,883,982 | 11/1989 | Forbes et al. | 310/62 |
| 4,925,321 | 5/1990 | Maruyama et al. | 384/114 |
| 4,955,791 | 9/1990 | Wrobel | 417/354 |
| 4,969,797 | 11/1990 | Takarai et al. | 415/113 |
| 5,008,572 | 4/1991 | Marshall et al. | 310/45 |
| 5,049,769 | 9/1991 | Reinhardt et al. | 310/64 |
| 5,127,744 | 7/1992 | White et al. | 384/112 |
| 5,128,571 | 7/1992 | Itsu | 310/67 |
| 5,204,567 | 4/1993 | Kinoshita et al. | 310/90 |
| 5,247,410 | 9/1993 | Ebihara et al. | 360/106 |
| 5,283,491 | 2/1994 | Jabbar et al. | 310/90 |
| 5,317,227 | 5/1994 | Palma et al. | 310/156 |
| 5,320,627 | 6/1994 | Sorensen et al. | 606/128 |
| 5,357,163 | 10/1994 | Minakuchi et al. | 310/90 |
| 5,382,853 | 1/1995 | von der Heide et al. | 310/67 R |
| 5,385,413 | 1/1995 | Murphy et al. | 384/564 |
| 5,394,043 | 2/1995 | Hsia | 310/90 |
| 5,406,154 | 4/1995 | Kawaguchi et al. | 310/67 R |
| 5,413,469 | 5/1995 | Nakajima et al. | 418/55.1 |
| 5,438,228 | 8/1995 | Couture et al. | 310/67 R |
| 5,481,143 | 1/1996 | Burdick | 310/68 B |
| 5,619,871 | 4/1997 | Forbes et al. | 68/23.7 |

FOREIGN PATENT DOCUMENTS

| | | |
|---|---|---|
| 0 533 532 A1 | 3/1993 | European Pat. Off. . |
| 2 283 371 | 5/1995 | United Kingdom . |

*Primary Examiner*—Steven L. Stephan
*Assistant Examiner*—Timothy A. Williams

[57] ABSTRACT

A brushless electric motor having an internal stator assembly including a lamination core and a heat sink. The motor includes an external rotor assembly adapted for rotational movement relative to the stator assembly about a central shaft. The motor also includes a tubular bearing support received within an inner space of the stator assembly adjacent to the lamination core and adjacent to the heat sink to facilitate a reduced axial length of the motor, the shaft being pressed into a bearing assembly retained within the bearing support to allow rotation of the shaft and therefore of the rotor assembly with respect to the stator assembly. The rotor assembly may have a cover with a central hub and a central shaft mounted within the hub. The motor may have a bearing assembly retained within the bearing support and receiving the shaft to allow rotational movement of the rotor assembly about the stator assembly.

26 Claims, 8 Drawing Sheets

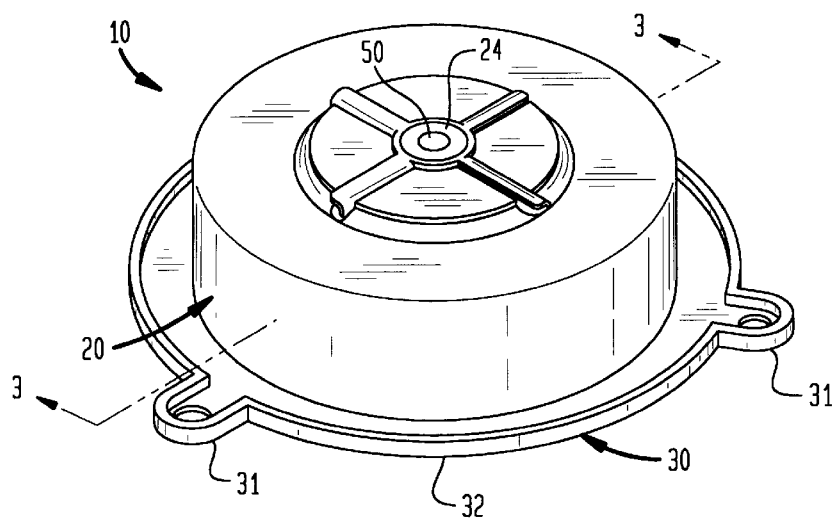
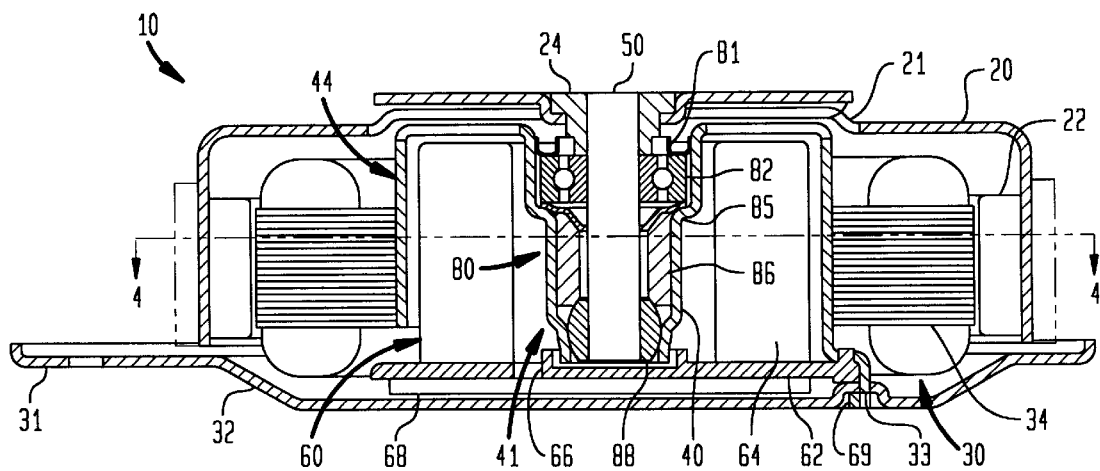

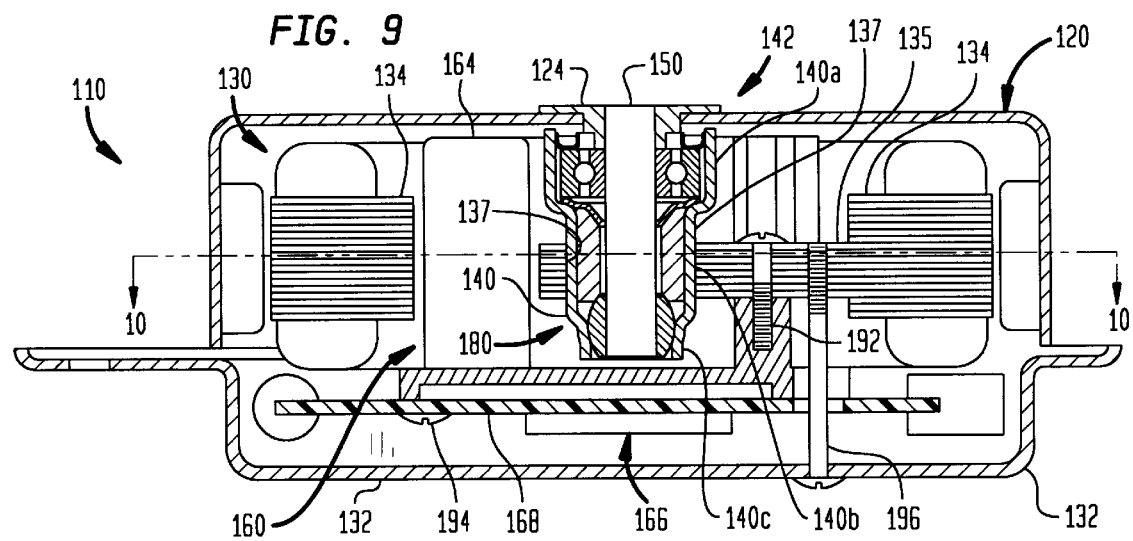
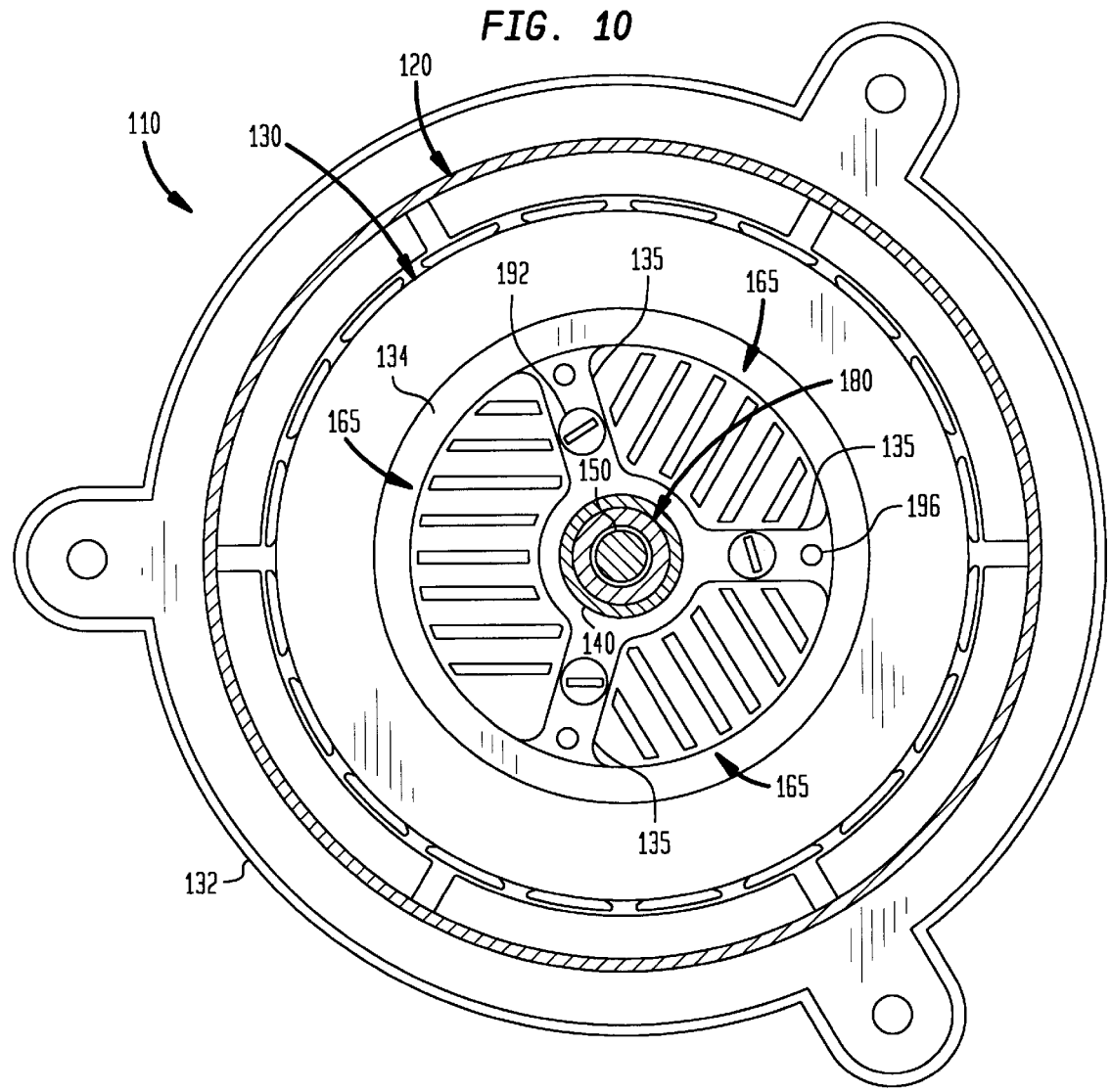

BRUSHLESS MOTOR WITH TUBULAR BEARING SUPPORT

FIELD OF THE INVENTION

The present invention relates to a brushless motor having a relatively compact design and a tubular bearing support. In particular, the present invention relates to a brushless motor having a tubular bearing support which facilitates the compact positioning of the lamination core and heat sink to provide a reduced axial length.

BACKGROUND OF THE INVENTION

Conventional electric motors may be characterized by a cylindrical housing, which contains the various stationary and rotating components of the motor, as well as the associated electronic circuitry. In a conventional electric motor (of conventional axial length) there may be two bearing assemblies for the rotating drive shaft, one in the end cap of the motor and another in a center tube within the motor.

Because of space constraints in some applications, such as automotive applications, it is desirable to have an electric motor of a reduced size, and particularly with a reduced axial length. When the axial length of an electric motor is reduced, for example as in a brushless motor, the configuration of the motor components, including the bearing assembly for the drive shaft, must be changed. In addition, when the overall size of the motor is reduced, it may become necessary to include a heat sink within the motor to properly dissipate heat generated during motor operation to prevent damage to the motor components and electronics. Developing a flow of cooling air through the motor also becomes more important when the overall size of the motor or its axial length is reduced and the motor components are positioned more closely tog ether. With less air flow, it may be necessary to increase the size of the heat sink, which may require an increase in overall motor size. In certain applications it is desirable to closely position the components of the motor, such as the lamination core, heat sink, bearing support and electronics to reduce the motor size, without significantly compromising motor performance.

It would be advantageous to have a brushless motor with a compact design made possible by a relatively compact, yet efficient arrangement of the bearing support and heat sink with relation to the lamination core and other motor components. It would also be advantageous to have a bearing support that was adapted to interchangeably receive a variety of types of bearing assemblies, as required or desired within the intended application. It would further be advantageous to have a bearing support that provided a stable mounting arrangement for the rotor and shaft within the motor, but yet that was designed to facilitate relatively low-cost motor assembly. Accordingly, it would be advantageous to have a brushless motor design in which the motor components, including the bearing support, are positioned for a reduced overall motor size and also for cooling air flow through the motor.

SUMMARY OF THE INVENTION

The present invention relates to a brushless electric motor with a stator assembly including a lamination core and a heat sink, a rotor assembly adapted for rotational movement relative to the stator assembly about a central shaft, and a tubular bearing support received within an inner space of the stator assembly adjacent to the lamination core and adjacent to the heat sink to facilitate a reduced axial length of the motor, the shaft being retained within a bearing assembly retained within the bearing support to allow rotation of the shaft and therefore of the rotor assembly with respect to the stator assembly.

The present invention also relates to a brushless motor having a stator assembly with a lamination core, a heat sink, a tubular bearing support, with the lamination core, the heat sink, and the bearing support each being mounted within the stator assembly. The brushless motor also has a rotor assembly with a cover having a central hub and a central shaft mounted within the hub, and a bearing assembly retained within the bearing support and receiving the shaft to allow rotational movement of the rotor assembly about the stator assembly.

BRIEF DESCRIPTION OF THE DRAWINGS

FIG. 1 is a perspective view of a brushless motor according to a preferred embodiment;

FIG. 3 is a cross-sectional side view of the motor;

FIG. 9 is a cross-sectional side view of the motor; and

FIG. 10 is a cross-sectional top view of the motor.

DETAILED DESCRIPTION OF THE PREFERRED EMBODIMENTS

Figure 2:
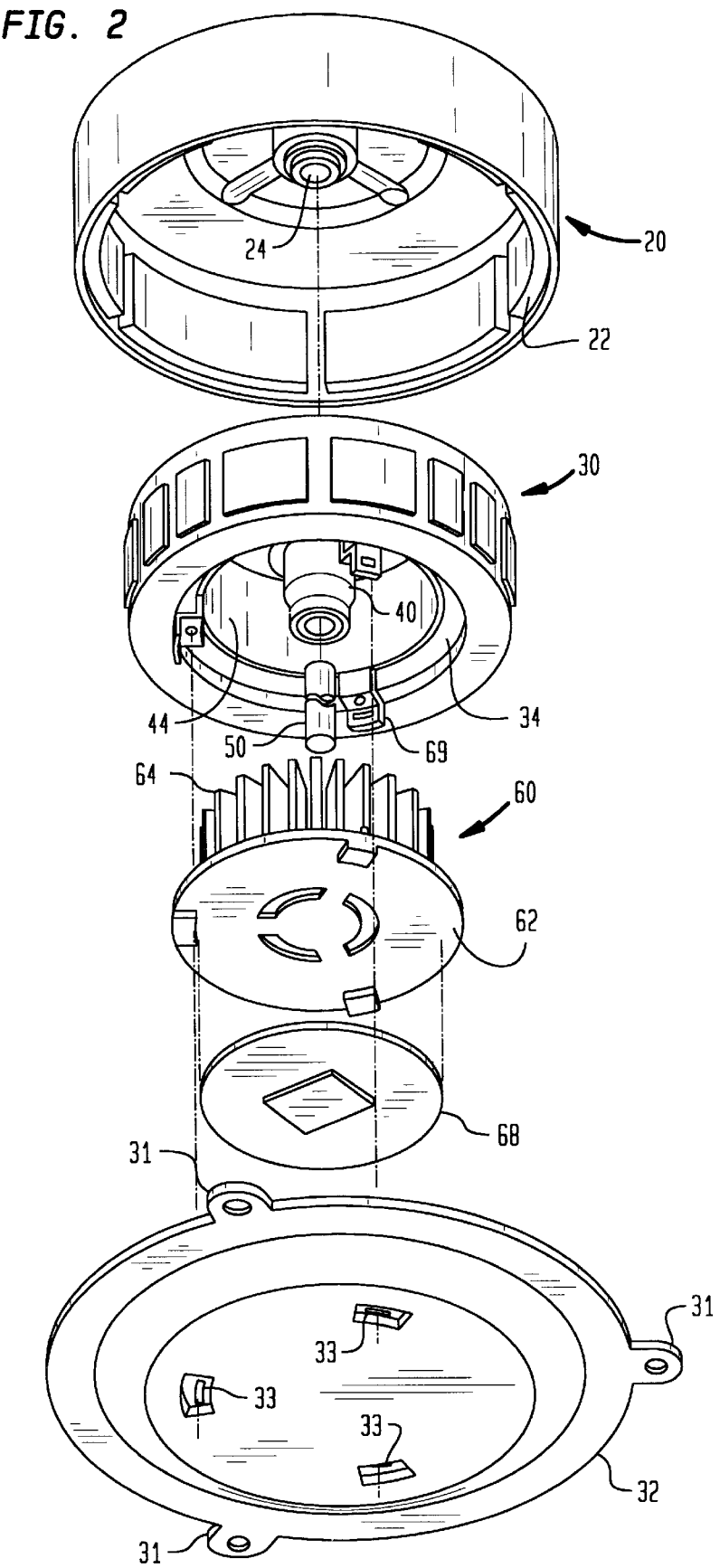
FIG. 2 is a perspective exploded view of the motor.

Referring to FIG. 1, a preferred embodiment of a compact brushless motor 10 having a relatively small axial length is shown in perspective view. Visible in FIG. 1 is the cylindrical shaped rotor 20 which is mounted for rotatable movement about the stator 30. Stator 30 includes an end cap 32, which has three mounting flanges 31 (two are visible) that allow motor 10 to be mounted in its intended application.

Stator 30 also includes a lamination core 34, a heat sink 60, and a bearing assembly 41 (with associated components). Rotor 20 rotates with respect to stator 30 about a central shaft 50. As visible in FIGS. 2 and 3, the compact arrangement of motor 10 is facilitated by the efficient spatial relationship of the components of stator 30. Rotor 20 is shown with six arcuate magnet segments 22 mounted within the inner perimeter (although other magnet configurations could be used in alternative embodiments). Rotor 20 is rotatably coupled to stator 30 by shaft 50 for transmitting power (i.e. torque) to a load (not shown). Shaft 50 is received within a bearing assembly (not visible) fitted within a generally tubular deep draw bearing support 40. Heat sink 60 and bearing support 40 are mounted within a central aperture in lamination core 34.

Lamination core 34 includes wire-wound laminations (any operable arrangement can be used) displaced outwardly and arranged to form a ring having an outer perimeter and an inner perimeter. Wire windings are not shown in FIGS. 2, 2A, 4, 5 and 6 and for simplicity; any winding pattern that is operable for a brushless motor can be employed in the lamination core. The outer perimeter of lamination core 34 is of a diameter that allows it to be received within rotor 20 to allow rotation about shaft 50 when motor 10 is assembled.

Figure 4:
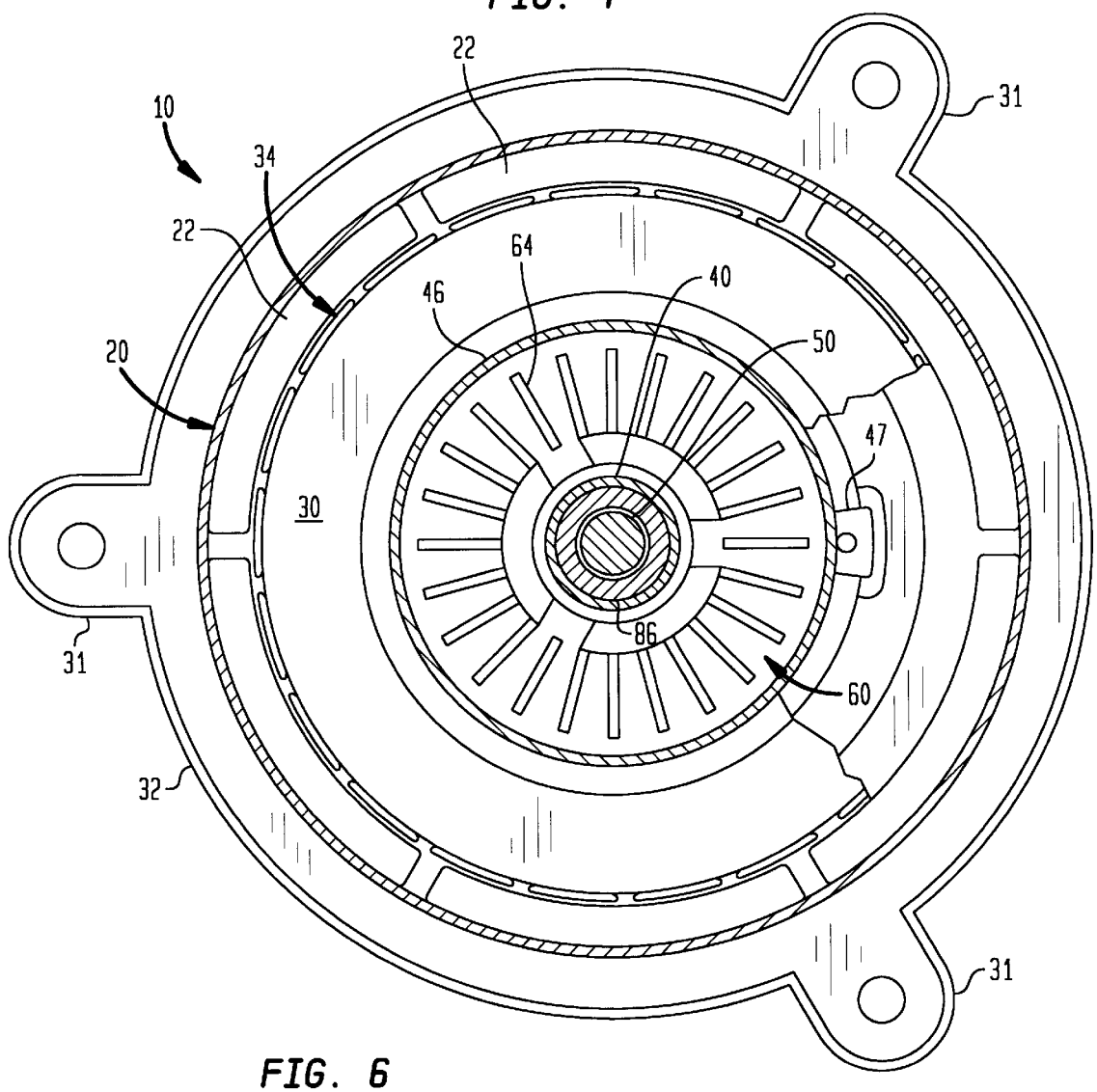
FIG. 4 is a cross-sectional top view of the motor.

Heat sink 60 has a generally flat circular base plate 62 and a series of generally flat rectangular-shaped fins 64 extending in a perpendicular direction from base plate 62 (in a "sun-ray" pattern shown more clearly in FIG. 4). The back of base plate 62 of heat sink 60 is coupled to the back of a circuit board 68 which contains the heat-generating electronic circuitry (shown generally) that is used to provide power to energize motor 10. Heat sink 60 is intended to carry heat away from circuit board 68 so as to dissipate heat and prevent a heat build-up that may otherwise damage components of motor 10 during operation.

As shown in FIGS. 2 through 4, lamination core 34 fits within rotor 20, and heat sink 60 fits within lamination core 34, which facilitates a motor design having a reduced and relatively small axial length. Heat sink 60 is mounted to end cap 32 by connecting tabs 69 which extend through slots 33 in end cap 32. Stator 30 thereby includes end cap 32, lamination core 34 and heat sink 60.

Figure 5:
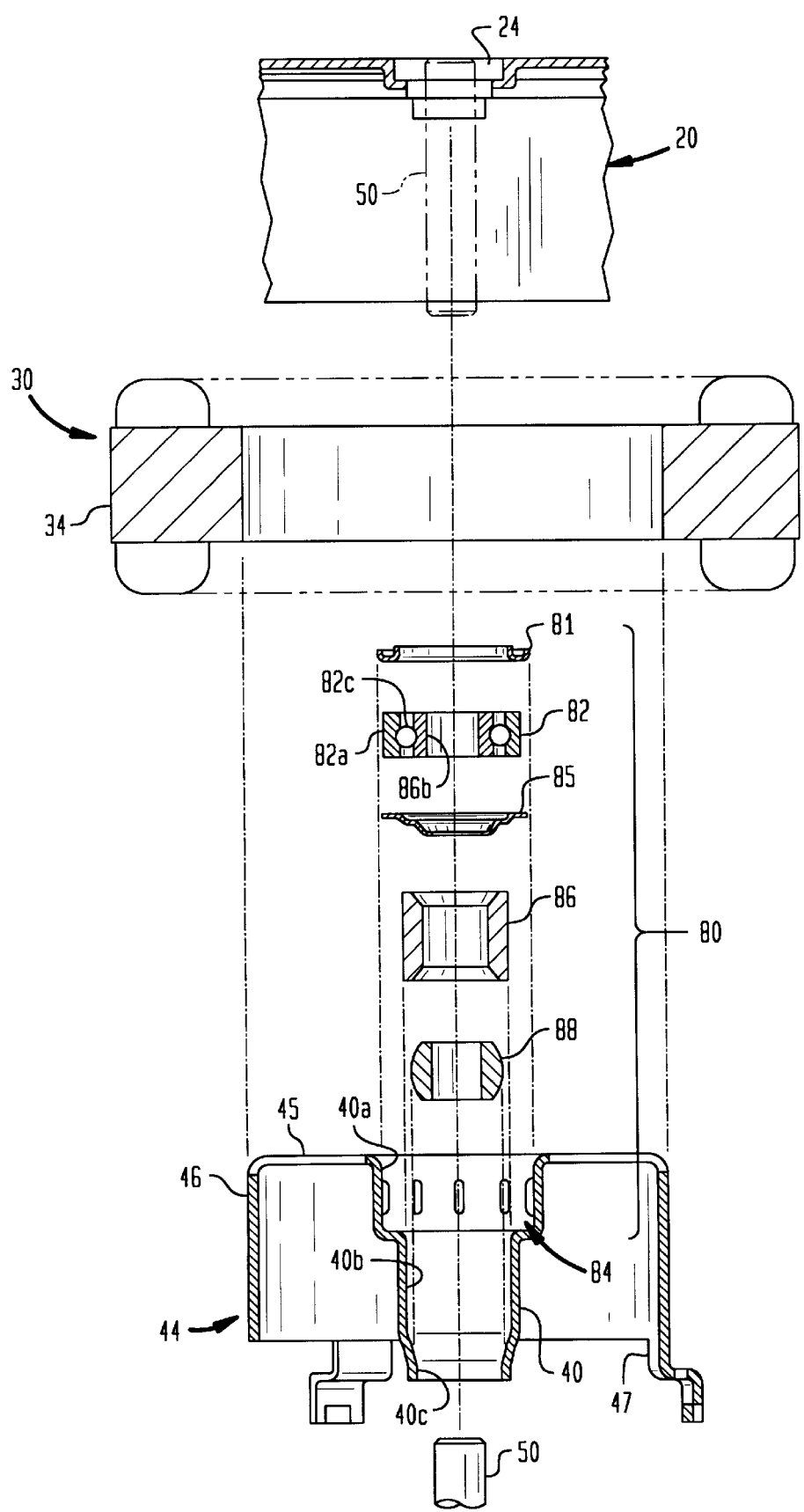
FIG. 5 is a cross-sectional cut-away exploded view of a bearing support and bearing assembly for the motor.
Figure 7:
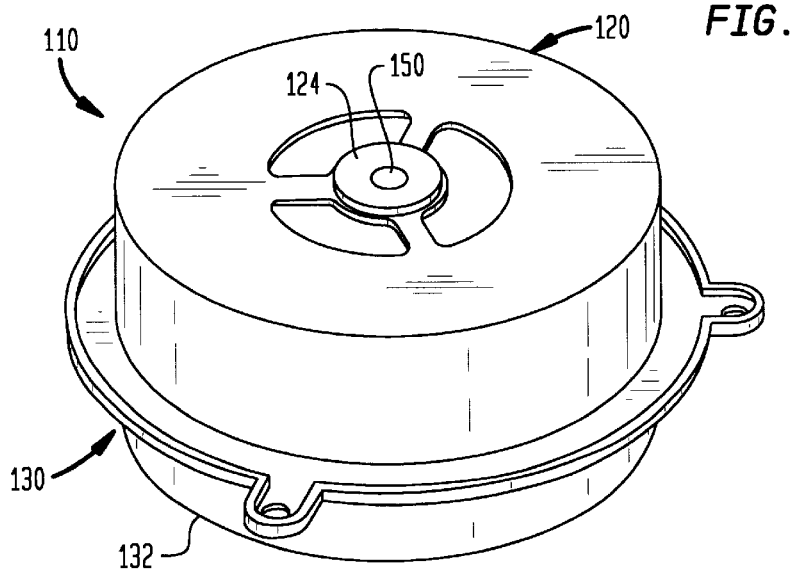
FIG. 7 is a perspective view of a brushless motor according to an alternative embodiment.

Bearing support 40 is shown in detail in FIG. 5. Bearing support 40 has a three-stage generally hollow cylindrical shape. The first stage 40a has the largest cross-sectional diameter; the second (central) stage 40b has a slightly smaller cross-sectional diameter; and the third stage 40c is of a somewhat tapered construction with a slightly narrowing cross-sectional diameter to its open end. Bearing support 40 is mounted within motor 10 to end cap 32 by a bearing mounting structure 44 (shown also in FIGS. 2A and 5) mounted as part of stator 30.

Figure 2A:
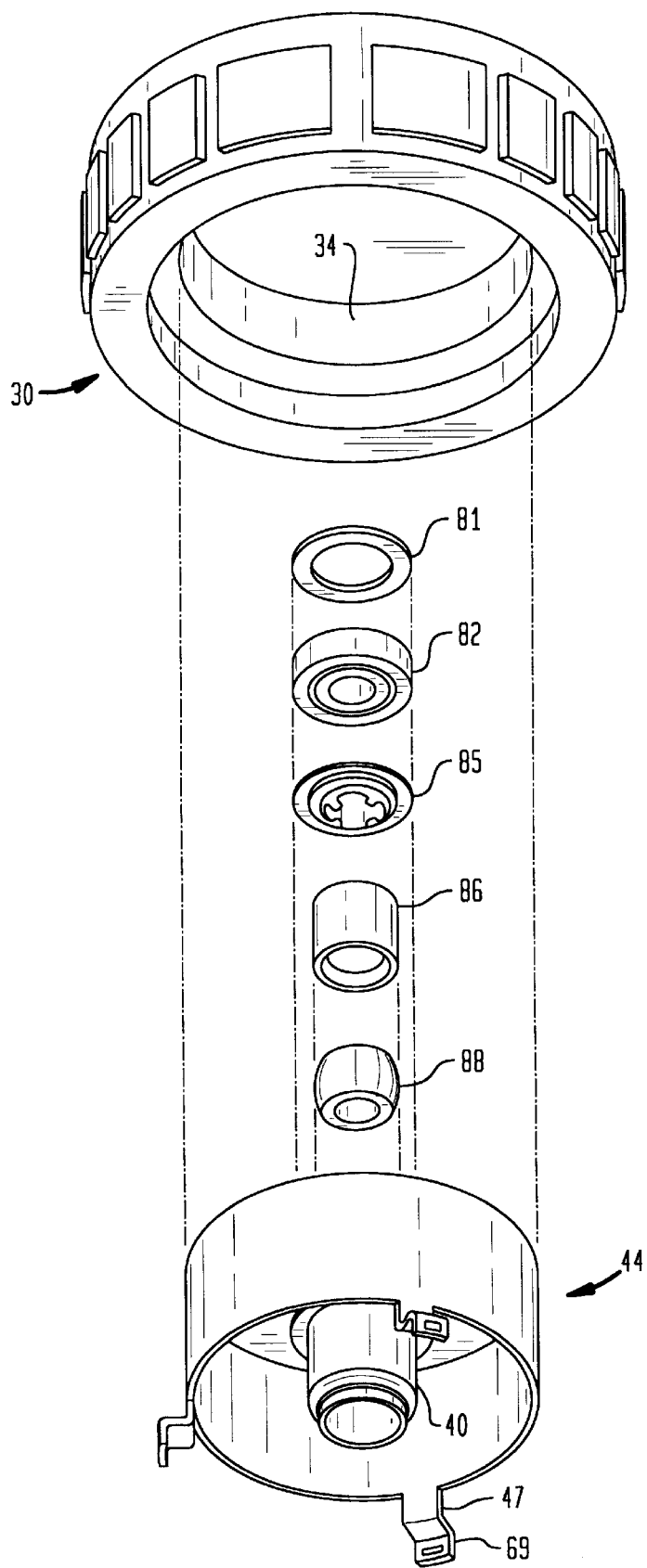
FIG. 2A is an exploded view of a bearing support and bearing assembly for the motor.

Referring to FIG. 5, bearing mounting structure 44 includes a circular top flange 45 outwardly extending from a slightly curved upper edge of first stage 40a of bearing support 40, in a direction generally perpendicular to the sides of bearing support 40. As shown in FIG. 2A, bearing mounting structure 44 also has a cylindrical portion 46 extending from a downwardly-curved circumferential edge of circular top flange 45 in a downward direction substantially parallel to the sides of bearing support 40. Mounting bracket 47 (three are shown in FIG. 2A) extends from the bottom edge of bearing mounting structure 44 (i.e. from the bottom edge of outer cylindrical portion 46) for fastening to end cap 32. As shown in FIG. 3, the lower portion of third stage 40c of bearing support 40 fits within a receiving collar 66 formed in the center of base plate 62 of heat sink 60; collar 66 prevents oil spillage from the bearing assembly into other motor components, and may also provide some degree of stabilization of bearing support 40 and therefore of shaft 50 within motor 10.

The compact structure of motor 10 facilitated by this arrangement of bearing support 40 is evident in FIGS. 3 and 4, where the complete motor assembly is shown to include (at the cross-section shown in FIG. 4) the outer wall of rotor 20, magnet 22, lamination core 34, the outer wall of cylindrical portion 46 of bearing mounting structure 44, fin 64 of heat sink 60, bearing support 40 (into which the bearing assembly is installed), and shaft 50. This arrangement has been found to provide for a compact, yet energy efficient motor with suitable thermal protection notwithstanding the close proximity of motor components. Rotor 20 is shown with ventilating aperture 21 to promote cooling air flow through motor 10. Suitable support for shaft 50 is also provided in this arrangement to reduce undesirable vibratory and other dynamic effects that may be encountered because of the manner in which shaft 50 is maintained within motor 10, as opposed to certain conventional motors.

Bearing support 40 is adapted to include any of an interchangeable variety of bearing assemblies (as required or desired in a particular application) without requiring modification of bearing support 40 itself. In FIGS. 2A, 3 and 5, bearing support 40 is shown having a ball-sleeve bearing assembly 80, which includes a bearing retainer 81, a ball bearing 82 of a known design with a fixed outer ring 82a, balls 82c and a rotating inner ring 82b), a bearing tolerance ring 84, a spacer retainer 85, a spacer 86 (containing oil or lubricant), and a sleeve bearing 88, each of which is securely retained within bearing support 40. Shaft 50 is press-fit into (and through) ball bearing 82 and into a hub 24 in rotor 20. As shown in FIGS. 3 and 5, ball bearing 82 is secured in first stage 40a, spacer 86 is secured in central stage 40b and sleeve bearing 88 is secured in third stage 40c of bearing support 40 when motor 10 is assembled. Shaft 50 is pressed into the inner ring 82b of ball bearing 82 and into hub 24 of rotor 20.

Figure 6:
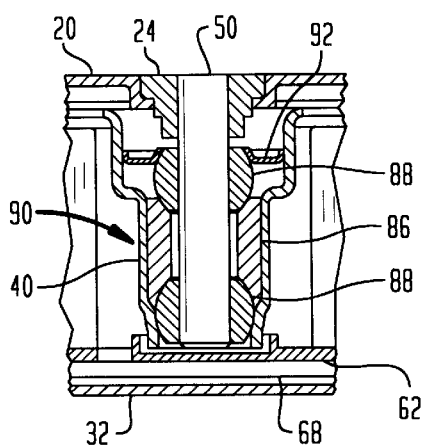
FIG. 6 is a cross-sectional cut-away side view of a bearing assembly for the motor.

In FIG. 6, bearing support 40 is shown having a double-sleeve bearing assembly 90 (having two sleeve bearings 88), which fits securely and is retained within bearing support 40 (with retainer 92). This type of bearing assembly is believed to be more quiet than a ball-sleeve bearing assembly and thus better suited for HVAC applications or the like. As is evident, other modifications may be made to the configuration and shape of the bearing support and associated motor components as necessary to accommodate other types of bearing assemblies.

An alternative embodiment of the motor is shown in FIGS. 7 through 10. Motor 110 according to this embodiment is of a similar basic design, flat and compact as shown in FIGS. 8A and 8B, with the lamination core 134 fitting within the rotor 120, and with a centrally-located heat sink 160 with extending fins 164. A circuit board 166 (with the electronics shown generally) simplified is mounted to the back of the base plate 162 of heat sink 160. Central motor shaft 150 is received within a bearing assembly 142 retained within a bearing support 140 fixed within the stator 130, i.e., within the assembly of lamination core 134, heat sink 160, and end cap 132. Rotor 120 is free to rotate about central shaft 150 with respect to stator 130 when motor 110 is energized.

Lamination core 134 has a "tri-spoke" configuration with three spokes 135 providing structural support. Heat sink 160 is of a "tri-fin" arrangement with three distinct sections 165 of fins 164 (also shown in FIG. 10). Each section 165 of fins 164 of heat sink 160 is configured to extend through a corresponding opening between spokes 135 of lamination core 134, which facilitates a relatively compact motor design with a reduced axial length. As rotor 120 rotates with respect to stator 130, air flow passes along fins 164 through motor 110 to provide cooling during motor operation. Each distinct section 165 of fins 164 in heat sink 160 is configured to facilitate this.

Deep draw bearing support 140 is of a generally hollow cylindrical shape. Bearing support 140 has a first cylindrical stage 140a having a larger outer diameter, a central cylindrical stage 140b having an intermediate outer diameter, and a third cylindrical stage 140c with a smaller outer diameter. Bearing support 140 is itself press-fit within a central circular aperture 137 in "tri-spoke" lamination core 134. Aperture 137 is of a suitable diameter to receive and securely retain intermediate stage 140b of bearing support 140. Shaft 150 is press-fit into cylindrical hub 124 in rotor 120 after it has been pressed through bearing assembly 142. Hub 124 of rotor 120 and aperture 137 of laminator core 134 provide structural mounting points for bearing support 140. A bearing assembly 142 fits within bearing support 140, as described previously. Shaft 150 rotates freely within bearing assembly 142. A ball-sleeve bearing assembly 180 is shown.

Figure 8A:
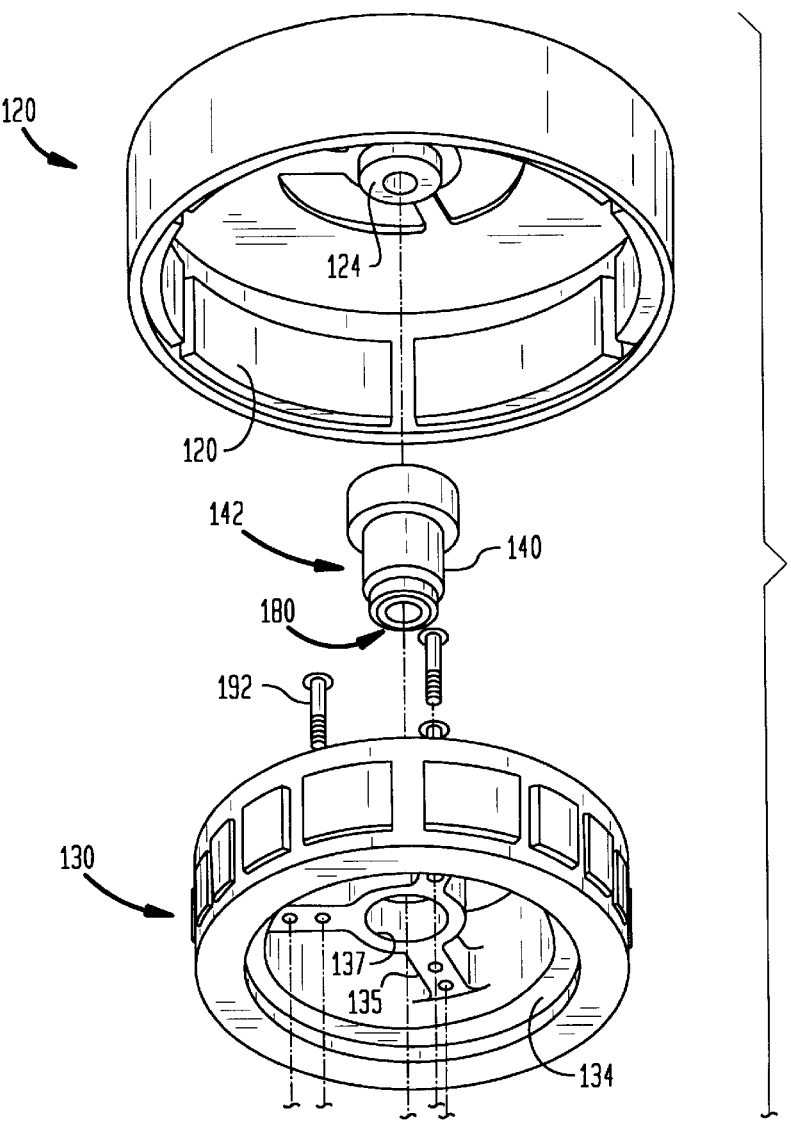
FIG. 8A is a partial perspective exploded view of the motor (continuing to FIG. 8B)
Figure 8B:
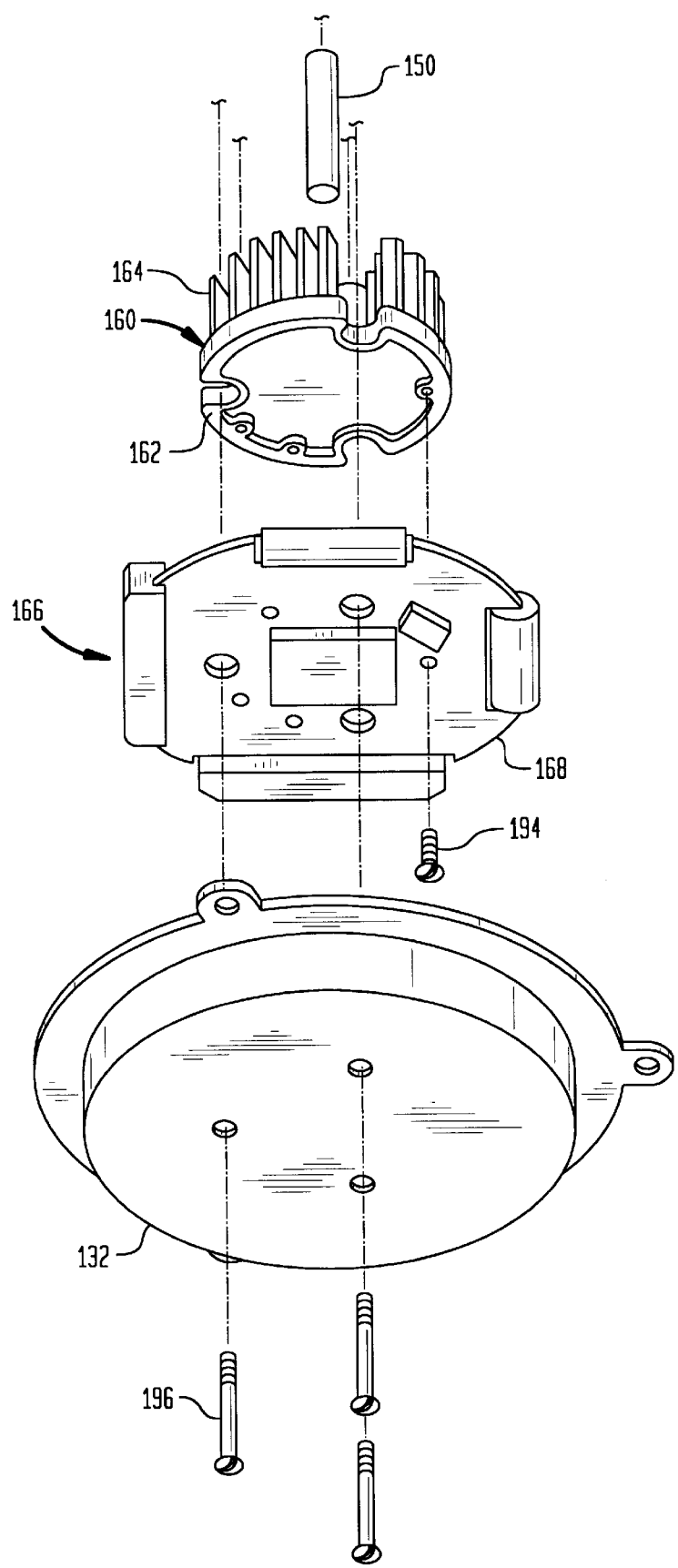
FIG. 8B is a partial perspective exploded view of the motor (continuing from FIG. 8A)

As is shown in FIGS. 8A and 8B and 9, lamination core 134 is fastened through holes in spokes 135, through heat sink 160, through circuit board 168 to end cap 132 by three bolts (shown as reference numeral 196); circuit board 168 is fastened to heat sink 160 by four screws (one is visible and shown as reference numeral 194); lamination core 134 is also fastened (through a second set of holes in spokes 135) directly to heat sink 160 by three bolts (given reference numerals 192). Alternatively to bolts, other suitable fasteners may be employed.

As is evident to those of skill in the art, the novel arrangement of motor components disclosed herein is not dependent upon a particular configuration of the lamination, wire-windings, magnets or electronics, provided that the configuration is operable. The arrangement may be employed in a wide variety of brushless motors, using a wide variety of configurations and materials. For example, while the bearing support is of a metal construction in any preferred embodiment, other suitable materials may also be used.

It is understood that, while the detailed drawings, specific examples, and particular components values given describe embodiments of the present invention, they serve the purpose of illustration only. The apparatus of the invention is not limited to the precise details and conditions disclosed. Further, although particular shapes and dimensions have been shown, various other shapes, geometries and dimensions could be used for the various components of the motor. Other substitutions, modifications, changes and omissions may be made in the design, operating conditions and arrangement of the preferred embodiments without departing from the spirit of the invention as expressed in the appended claims.

What is claimed is:

1. A brushless electric motor, which comprises:
    a stator assembly including a lamination core defining an inner space, and a heat sink;
    a rotor assembly having a central shaft adapted for rotational movement relative to the stator assembly about the shaft; and
    a tubular bearing support received within the inner space of the stator assembly adjacent to the lamination core and adjacent to the heat sink to facilitate a reduced axial length of the motor, the shaft being retained within a bearing assembly within the bearing support to allow rotation of the shaft and therefore of the rotor assembly with respect to the stator assembly;
    wherein the heat sink comprises a baseplate and a plurality of fins extending from the baseplate and oriented in an axial direction, in substantial alignment with the shaft, said fins being disposed within the inner space of the lamination core.

2. The motor of claim 1 wherein the bearing support is press-fit within a central aperture within the lamination core.

3. The motor of claim 1 wherein the plurality of fins extends from the baseplate in a substantially perpendicular orientation.

4. The motor of claim 1 wherein the bearing support is mounted to the stator assembly by at least one fastener.

5. The motor of claim 1 wherein the bearing assembly is a double-sleeve bearing assembly.

6. The motor of claim 1 wherein the bearing assembly is a ballbearing-sleeve bearing assembly.

7. The motor of claim 1 wherein the heat sink comprises a base plate and a plurality of fins extending therefrom through a plurality of apertures within a central portion of the lamination core.

8. The motor of claim 1 further comprising a cover having at least one aperture adapted to facilitate a flow of cooling air through the motor during operation.

9. The motor of claim 7 wherein the heat sink has a retaining collar.

10. A brushless electric motor, which comprises:
    (a) a stator assembly having a lamination core, a heat sink, and a tubular bearing support, the lamination core, the heat sink, and the bearing support each being mounted within the stator assembly;
    (b) a rotor assembly having a cover, a central hub and a central shaft mounted within the hub; and
    (c) a bearing assembly retained within the bearing support and receiving the shaft to allow rotational movement of the rotor assembly about the stator assembly;
        wherein the heat sink comprises a plurality of fins oriented in an axial direction, in substantial alignment with the shaft and the fins are disposed in an inner space defined by the lamination core.

11. The motor of claim 10 wherein the shaft is press fit into the bearing assembly and also into the hub of the rotor assembly.

12. The motor of claim 10 wherein the bearing assembly comprises a ballbearing-sleeve bearing assembly.

13. The motor of claim 10 wherein the bearing assembly comprises a double-sleeve bearing assembly.

14. The motor of claim 10 wherein the lamination core includes three spokes.

15. The motor of claim 10 wherein the heat sink comprises three sections of fins.

16. The motor of claim 10 wherein the lamination core includes three spokes and the heat sink comprises three sections of fins, wherein each of the three sections of fins is received within a corresponding space between the spokes of the lamination core.

17. The motor of claim 10 wherein the heat sink has a base and the plurality of fins extend perpendicularly from the base.

18. The motor of claim 17 wherein the shaft is press fit into the bearing assembly and also into the hub of the rotor assembly.

19. The motor of claim 17 wherein the shaft is press fit into the bearing assembly.

20. The motor of claim 17 wherein the bearing support is press-fit within a central aperture within the lamination core.

21. The motor of claim 1 wherein the tubular bearing support is formed within a bearing mounting structure which is disposed within the inner space of the lamination core.

22. The motor of claim 21 wherein the tubular bearing support is integral with the bearing mounting structure.

23. The motor of claim 1 wherein the rotor comprises at least one ventilation aperture constructed and arranged to pass air therethrough to thereby remove heat from the heat sink.

24. The motor of claim 10 wherein the tubular bearing support is formed within a bearing mounting structure which is disposed within the inner space of the lamination core.

25. The motor of claim 24 wherein the tubular bearing support is integral with the bearing mounting structure.

26. The motor of claim 10 wherein the rotor comprises at least one ventilation aperture constructed and arranged to pass air therethrough to thereby remove heat from the heat sink.

* * * * *